(12) United States Patent
Haugan et al.

(10) Patent No.: US 10,910,836 B2
(45) Date of Patent: Feb. 2, 2021

(54) DISTRIBUTION OF ELECTRIC ENERGY ON A VESSEL

(71) Applicant: Siemens Aktiengesellschaft, Munich (DE)

(72) Inventors: Espen Haugan, Trondheim (NO); Harald Kjesbu, Hell (NO); Alf Olav Valen, Jakobsli (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/499,261

(22) PCT Filed: Apr. 5, 2018

(86) PCT No.: PCT/EP2018/058790
§ 371 (c)(1),
(2) Date: Sep. 28, 2019

(87) PCT Pub. No.: WO2018/185249
PCT Pub. Date: Oct. 11, 2018

(65) Prior Publication Data
US 2020/0185917 A1 Jun. 11, 2020

(30) Foreign Application Priority Data
Apr. 7, 2017 (EP) ..................................... 17165555

(51) Int. Cl.
*H02J 3/00* (2006.01)
*H02J 9/06* (2006.01)
*H02H 3/087* (2006.01)

(52) U.S. Cl.
CPC ........... *H02J 3/0073* (2020.01); *H02H 3/087* (2013.01); *H02J 9/061* (2013.01)

(58) Field of Classification Search
CPC .. H02J 3/0073; H02J 9/061; H02J 3/00; H02J 9/06; H02H 3/087
See application file for complete search history.

(56) References Cited

FOREIGN PATENT DOCUMENTS

| EP | 2966740 A2 | 1/2016 |
|----|-----------|--------|
| EP | 3035477 A1 | 6/2016 |
| EP | 3046206 A1 | 7/2016 |
| WO | 2016116595 A1 | 7/2016 |

OTHER PUBLICATIONS

International search report and written opinion dated Jun. 28, 2018 for corresponding PCT/EP2018/058790.

*Primary Examiner* — Robert L Deberadinis

(57) ABSTRACT

An electrical energy distribution system for a vessel or platform with at least a primary energy source comprising an AC generator. A first output of the AC generator is coupled to a first DC bus via a transformer and an AC to DC converter and a second output of the AC generator is separately coupled to a second DC bus via a rectifier. The second DC bus is operable at a first voltage level and is connected to one or more primary consumers. The first DC bus is operable at a second voltage level, lower than the first voltage level and is connected to secondary consumers. In the event of the output of the AC generator to the primary consumers on the first DC bus being insufficient, energy from electric energy storage elements is supplied to the primary consumers via the rectifier and the first DC bus.

17 Claims, 5 Drawing Sheets

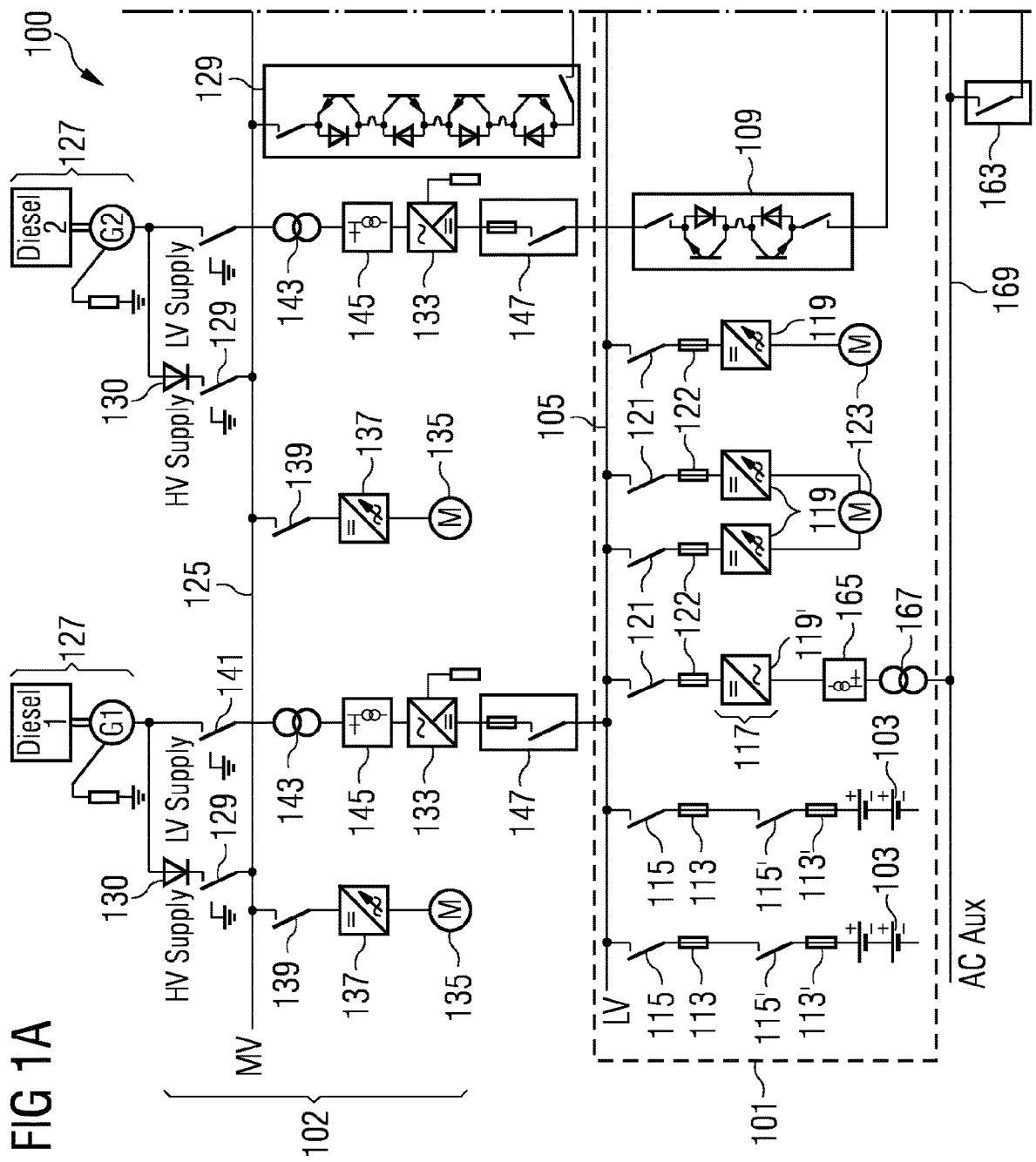

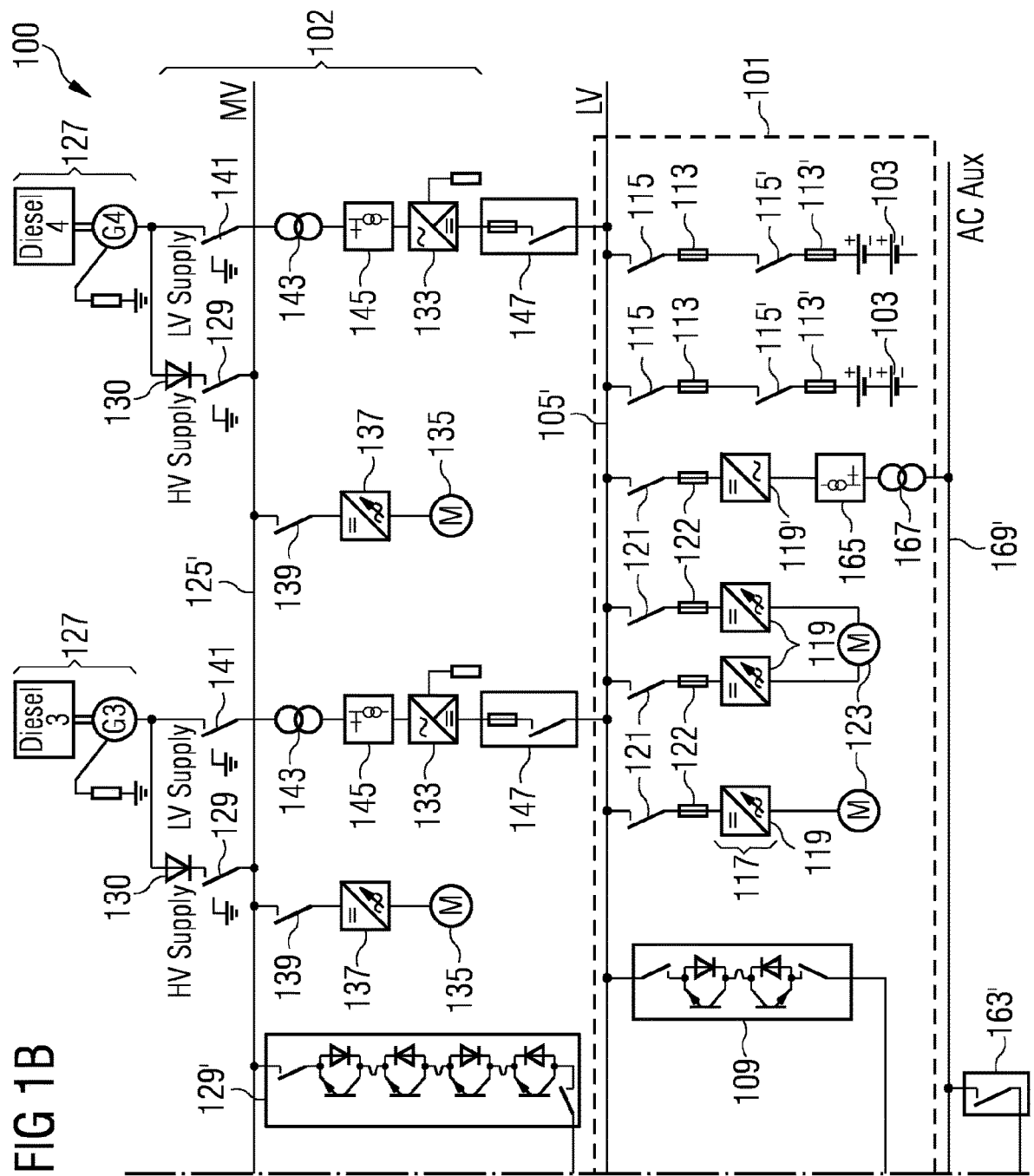

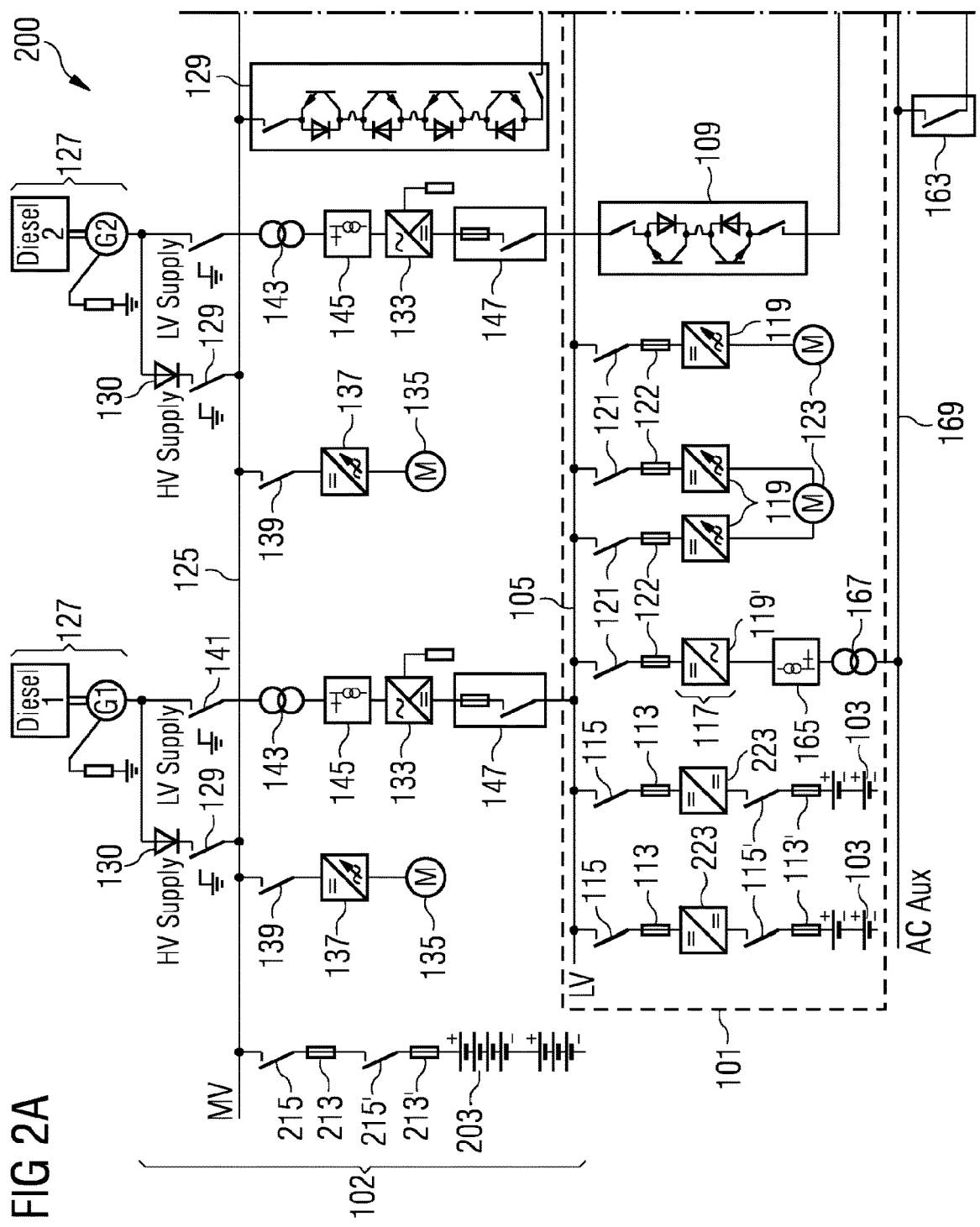

DISTRIBUTION OF ELECTRIC ENERGY ON A VESSEL

CROSS REFERENCE TO RELATED APPLICATIONS

This application is the US National Stage of International Application No. PCT/EP2018/058790 filed Apr. 5, 2018, and claims the benefit thereof. The International Application claims the benefit of European Application No. EP17165555 filed Apr. 7, 2017. All of the applications are incorporated by reference herein in their entirety.

TECHNICAL FIELD

The present disclosure relates to an arrangement for distribution of electric energy on a vessel, including a ship or platform and to a method of operating an arrangement for distribution of electric energy on a vessel.

BACKGROUND

For operating a vessel, in particular a ship or a platform, e.g. oil exploration platform, electric energy may need to be distributed to a number of consumers, such as thrusters and pumps, which are to be operated on a vessel. The electric energy may be generated by prime movers, such as diesel engines and generators, or may be supplied from an energy store. The vessel or platform may comprise essential components that need to be supplied with electric energy even in the case of a failure of some part of the energy distribution system. In case of a failure, a backup energy storage system may be required, to provide the electric energy that is unavailable due to a failure.

A vessel may have a number of thrusters which are essential for operation, a typical number being four or eight thrusters, which are supplied with power over an AC main supply grid. In order to operate the vessel properly and in particular to maintain the position of the vessel in the water, these thrusters must remain operational. For each of the essential thrusters, a particular backup energy storage system may be provided which may supply the thruster with electric energy in case of a failure, for example a failure in a main energy supply grid. Individual energy storage backup systems may be required to have a relatively high capacity and may therefore be relatively large in size, costly and complex.

Furthermore, since energy storage systems typically operate with DC input/output, there is an integration problem. Managing dynamic stability in the AC main supply grid can be difficult when supply to the AC main supply grid varies, along with variable demand from the thrusters and other components that are coupled thereto.

Hence it is desirable to provide an improved arrangement for distribution of electric energy on a vessel and for a method for operating an arrangement for distribution of electric energy on a vessel.

This need may be met by the subject matter according to the independent claims. Advantageous embodiments of the present invention are described by the dependent claims.

SUMMARY

In accordance with a first aspect of the present invention, an electrical energy distribution system for a vessel or platform comprises at least a primary energy source; wherein the primary energy source comprises an AC generator; wherein a first output of the AC generator is coupled to a first DC bus via a transformer and an AC to DC converter; and wherein a second output of the AC generator is separately coupled to a second DC bus via a rectifier; wherein the second DC bus is operable at a second voltage level and is connected to one or more primary consumers; wherein the first DC bus is operable at a first voltage level, lower than the second voltage level and is connected to secondary consumers; and wherein, in the event of the output of the AC generator to the primary consumers on the second DC bus being insufficient, energy from electric energy storage elements is supplied to the primary consumers via the rectifier and the second DC bus.

In the present invention, a first output of the AC generator is coupled to a first DC bus via a transformer and an AC to DC converter and a second output of the AC generator is separately coupled to a second DC bus via a rectifier. This has the advantage that in case of a failure, or insufficiency, of a primary energy supply, stored energy from the first DC bus may be supplied to the consumers on the second DC bus. For example, a second DC-circuit is able to supply stored energy to AC consumers in a first AC consumer group if the primary electric energy supply fails, or is insufficient for the supply requirement, and is able to supply AC consumers in a second AC consumer group coupled thereto at the same time even if the first and second AC consumer groups have different supply requirements.

A second DC-circuit may be operable at a different voltage to that of a first DC-circuit, for example the second DC-circuit associated with the second DC bus may be operable at a higher voltage than the first DC-circuit associated with the second DC bus.

Preferably, both of the DC circuits may include a stored energy source. Thus, stored energy may be supplied from the DC buses, as required. The primary energy source may comprise a plurality of generators to supply electric energy to the first DC-circuit, and to the second DC-circuit, in normal operation. The rectifier may comprise a diode rectifier.

The second DC-circuit may comprise a Medium Voltage, "MV" DC-circuit. The second DC-circuit may be operated for example between 10 kV and 20 kV, such as between 10 kV and 15 kV, in particular at around 12 kV DC. Thereby, the voltage may be appropriate to power conventional consumers, in particular conventional AC consumers which may be connected, via inverters to the second DC-circuit. The second DC-circuit may comprise a number of sections of high power cables. The second DC-circuit may comprise several sections of DC-bar (DC bus bars).

The first DC-circuit may comprise a Low Voltage, "LV" DC-circuit and may be operated for example below 1200 V, such as between 500 V and 1000 V, in particular at around 930 V DC. Thereby, the voltage may be appropriate to power conventional consumers that operate at different rating than those coupled to the second DC-circuit, in particular conventional AC consumers which may be connected, via inverters to the first DC-circuit. The first DC-circuit may comprise a number of sections of high power cables. The first DC-circuit may comprise several sections of DC-bar (DC bus bars).

There are several advantages to having such first and second DC-circuits coupled to one another via a power converter. These include providing protection between the circuits, and also enabling active management of the flow of electric power in the distribution arrangement in the event of failure of the primary electric energy supply, and in normal operating conditions.

The matching of the first and second groups of AC consumers to the operating voltages of the first and second DC-circuits respectively avoids the need for transformers as required in an AC distribution arrangement for the various consumers, and simplifies the connection of and operation of the backup electric energy storage elements in the distribution arrangement. Also, since DC-circuits are used for supply the problems of instability of weak AC distribution systems are avoided. Integration of the backup electric energy storage elements with the AC consumers can be done with a consistent architecture even for different AC consumers that require significantly different amounts of power during operation of the vessel.

The first DC-circuit may be operatively coupled to the second DC-circuit via power converter that is adapted to control input and output current and/or input and output voltage, using pulse width modulation. The first DC-circuit may be operatively coupled to the second DC-circuit via a power converter that comprises an inverter, transformer and rectifier, such that in event of failure of the primary electric energy supply it is possible for electric energy from the first DC-circuit to be passed to the second DC-circuit at voltage consistent with the normal operating conditions of the second DC-circuit.

In this way the AC consumers in the second AC consumer group may operate without needing any individual reconfiguration in the event of failure of the primary electric energy supply.

The first DC-circuit may be operatively coupled the primary electric energy supply via a power converter, in normal operation of the primary electric energy supply. The first DC-circuit may be operatively coupled to the primary electric energy supply via a power converter that is adapted to control output voltage using pulse width modulation.

Use of a power converter in this way enables the output of the primary electric energy supply to be matched to the requirements of the AC consumers in the first AC consumer group, and to the backup electric energy storage elements so that electric energy can be selectively supplied to both in normal operation of the primary electric energy supply.

The power converter that couples the first DC-circuit to the primary electric energy supply in normal operation of the primary electric energy supply may be configured for two way operation, such that in normal operation of the primary electric energy supply electric energy passes there-through from the primary electric energy supply to the first DC-circuit, and in event of failure of the primary electric energy supply may pass electric energy there-through to the second DC-circuit from the first DC-circuit.

The power converter may thus be switchable between rectifier operation to pass AC from the primary electric energy on to first DC-circuit as DC, and to pass DC from the first DC-circuit as AC, for rectification and delivery to the second DC-circuit. In this way an AC connection from the primary electric energy supply to the first DC-circuit can be used in both directions, thus simplifying the arrangement.

The arrangement for distribution of electric energy may also comprise components for generating the electric energy, such as diesel generators or gas turbine generators. The primary electric energy supply may comprise one or more generators to supply electric energy to the first DC-circuit, and to the second DC-circuit, in normal operation. For example, the second DC-circuit may be coupled to a plurality of generators connected in a ring, for supplying electric energy to the second DC-circuit. Electric energy supplied to the ring may then pass to one or more AC consumers of the first AC consumer group in the first DC-circuit, and further comprises at least one breaker unit operable to disconnect one or more generators from the second DC-circuit in the event of a fault on the second DC-circuit, such as a fault associated with a generator. If one of the generators fails, other associated generators may still provide substitute electric energy to essential AC consumers in either the second DC-circuit, or through the power converter to the first DC-circuit. Thus, a reliability of the energy distribution arrangement may be enhanced.

The first DC-circuit may comprise a plurality of backup electric energy storage elements connected in a ring, for supplying electric energy to the first DC-circuit, and further for supplying electric energy there-from to one or more AC consumers in the second DC-circuit in the event of failure of the primary electric energy supply. The first DC-circuit may further comprise at least one breaker unit operable to disconnect one or more backup electric energy storage elements from the first DC-circuit in the event of a fault on the first DC-circuit, such as a fault associated with a backup electric energy storage element. If one of the backup electric energy storage elements fails, other associated backup electric energy storage elements may still provide substitute electric energy to essential AC consumers in either the second DC-circuit, or through the power converter to the first DC-circuit. Thus, a high reliability of the energy distribution arrangement may be further enhanced.

The arrangement for distribution of electric energy may comprise batteries as the backup electric energy storage elements.

The backup electric energy storage elements are, as set out above, provided to enable consistency of supply to essential elements, in particular essential AC consumers in either AC consumer group, such as thrusters, in case of a failure or deficiency of the primary electric supply. The backup electric energy storage elements may directly feed electric energy into the first DC-circuit, and indirectly feed AC consumers in the second DC-circuit.

Essentially, the backup electric energy storage elements may provide a DC power supply to the first and second DC-circuits in case of a failure. Under normal conditions, the plural backup electric energy storage elements may be loaded or charged from the primary electric energy supply. Each one of the plural backup electric energy storage elements may, individually or in combination with other backup electric energy storage elements, be disconnected from the first DC-circuit, in order to remove them from the ring. Thus, in case of a potential failure in one of the backup electric energy storage elements, the backup electric energy storage element having the failure may be disconnected from the first DC-circuit, in a fast and reliable manner. This enables continued operation of the other backup electric energy storage elements, either to provide electric energy to consumers of the vessel, or to allow the backup elements to be charged or loaded, when the supply thereto is operating normally.

There are several advantages to having the plurality of backup electric energy storage elements, connected to each other in a ring in normal operation. In particular, different AC consumers installed in the vessel, such as different thrusters, may require different amounts of power during operation of the vessel. Since, in the arrangement according to example embodiments of the present invention, a particular backup electric energy storage elements, is not associated with one particular consumer exclusively, the backup elements may be able to have a lower energy supply capacity compared to conventional systems.

This is be because energy output of the plurality of backup electric energy storage elements may be shared and combined and be used to supply to any, or all, of the different consumers on either first or second DC-circuits. In particular, supplying energy only from a specific associated backup electric energy storage element to a specific AC consumer avoids the need for a particular backup electric energy storage element to be designed to supply sufficient power to a particular AC consumer. The combined power output of all the backup elements can be chosen such that the combined power demand of all consumers may be satisfied. Thereby, space and complexity and capacity of the plurality of backup electric energy storage elements may be reduced compared to conventional systems.

The breaker unit may comprise one or more sensors and an electronic controller which operates the sensor and acquires measurement signals. Thus, the breaker unit may operate autonomously, in an independent manner. The breaker unit may be programmed in order to set the threshold value above which the breaker unit may disconnect or disrupt the connection within the ring. Thus, no additional measurement or control equipment may be required to operate the arrangement.

For setting the arrangement for distribution of electric energy in a normal operation state or a failure state, plural switches may be provided between different components of the arrangement. At least the switches between the backup elements may be configured as breaker units having very fast switching speeds. Other switches may also comprise mechanical switches which have much lower switching speeds, such as switching speeds which are 10 times less than the switching speed of the breaker units between the backup elements.

According to an embodiment of the present invention, an AC consumer is connectable, to the DC-circuit via an inverter system. The AC consumer may comprise one or more of a variable speed drive, a thruster or auxiliary equipment.

The inverter system may invert the DC power stream to an AC power stream or a power stream comprising a square or rectangular signal having adjustable duty cycle and frequency. In particular, a thruster may be operated at a desired frequency and the inverter system may be adapted to provide the power stream having the desired frequency, such as a harmonic power stream or a rectangular or square-like wave.

In this way, different thrusters of the vessel may for example be operated at different frequencies or rotation speeds, so as to ensure positioning of the vessel as desired.

According to an embodiment of the present invention, at least one thruster receives energy from the DC-circuit via two inverters of the inverter system. Providing four two streams for the AC consumers may support conventional AC consumers, such as thrusters in an advantageous manner. Other numbers of inverters may be possible.

The second AC consumer group may comprise a thruster fed from the second DC-circuit by a thruster inverter, with the first AC-Consumer group comprising auxiliary equipment associated with that thruster which is fed from the first DC-circuit by an auxiliary inverter. The auxiliary inverter may be provided with two connections to the first DC-circuit, for example to different parts of the distribution ring of the second DC-circuit.

According to an embodiment of the present invention, the arrangement further comprises an AC-bar, having AC consumers in a third AC consumer group coupled thereto. The AC-bar may be fed through an inverter with electric energy from the first DC-circuit. The AC consumers of the third AC consumer group may comprise auxiliary equipment. The AC-bar may be connectable to at least one other AC-bar to form an AC-ring.

The vessel may be operated on the sea and may for example comprise a platform or a ship.

It should be understood that features which are individually or in any combination provided, explained or employed for an arrangement for distribution of electric energy on a vessel may also be provided or used in a method for operating an arrangement for distribution of electric energy on a vessel according to an embodiment of the present invention and vice versa.

There may be provided a method of operating a stored electric energy distribution arrangement for distribution of electric energy on a vessel comprising a plurality of AC consumers, the method comprising: supplying electric energy to one or more AC consumers in a first AC consumer group coupled to a first DC-circuit, from a backup electric energy storage element of the first DC-circuit in the event of failure of the primary electric energy supply; and supplying electric energy to one or more AC consumers in a second AC consumer group coupled to a second DC-circuit, from the first DC-circuit and via a power converter, in the event of failure of the primary electric energy supply.

In accordance with a second aspect of the present invention, a method of operating an electrical energy distribution system for a vessel or platform, the system comprising at least a primary energy source; wherein the primary energy source comprises an AC generator; wherein a first output of the AC generator is coupled to a first DC bus via a transformer and an AC to DC converter; and wherein a second output of the AC generator is separately coupled to a second DC bus via a rectifier; wherein the second DC bus is connected to one or more primary consumers; wherein the first DC bus is connected to secondary consumers; the method comprising operating the first DC bus at a first voltage level; operating the second DC bus at a second voltage level, higher than the first voltage level; and in the event of the output of the AC generator to the primary consumers on the second DC bus being insufficient, supplying energy from electric energy storage elements to the primary consumers via the rectifier and the second DC bus. The method may be performed by an arrangement for energy distribution as is mentioned in any of the embodiments described herein.

Other features of the invention will be apparent from the dependent claims, and the description which follows.

BRIEF DESCRIPTION OF THE DRAWINGS

Embodiments of the present invention are now described with reference to the accompanying drawings. The invention is not restricted or limited to the illustrated or described embodiments.

Embodiments of the invention have been described with reference to different subject matter. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter, any combination of features relating to different subject matter, in particular between features of the method type claims and features of the apparatus type claims is considered to be disclosed by this document too.

Figure 2B:
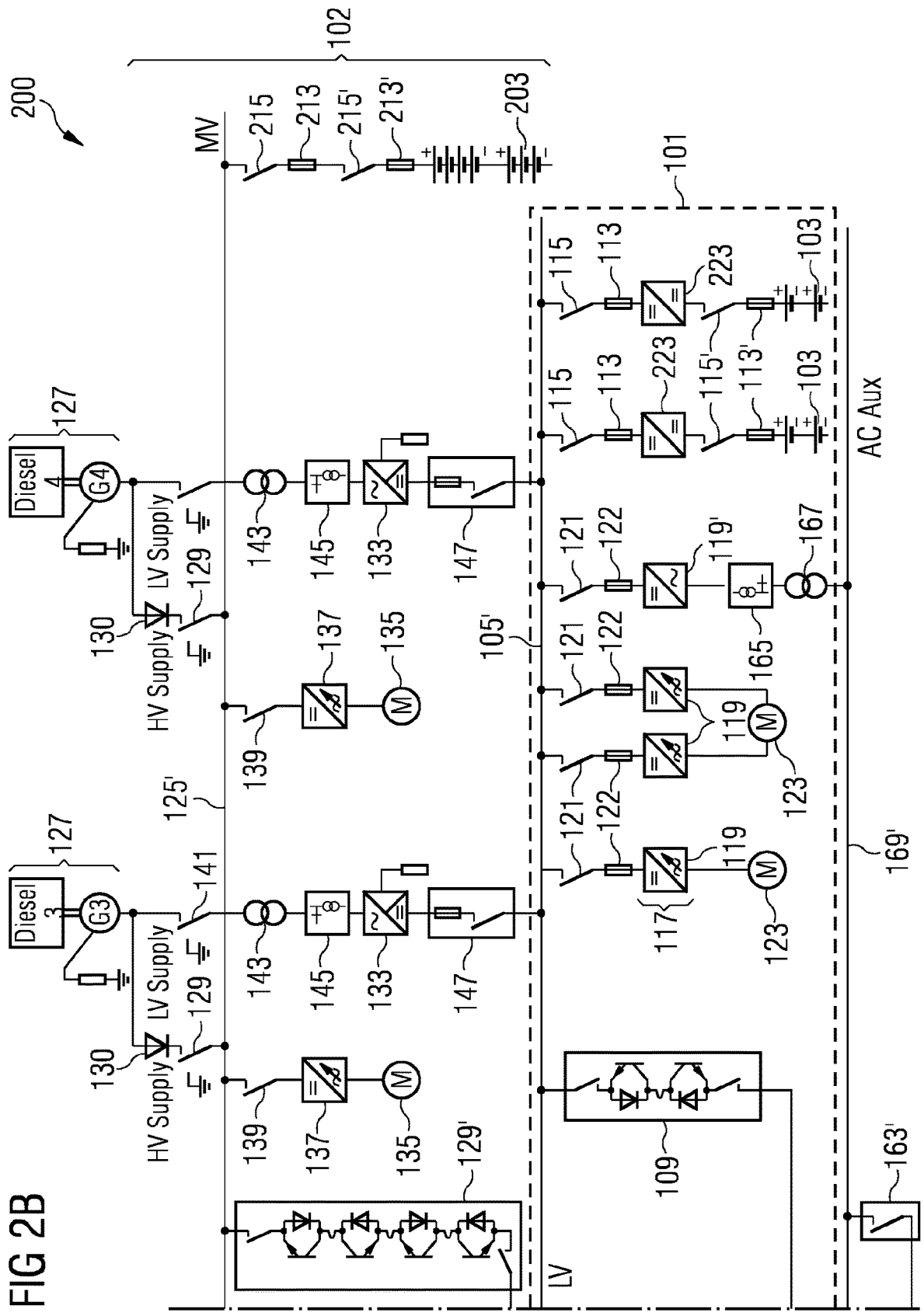
Figure 3:
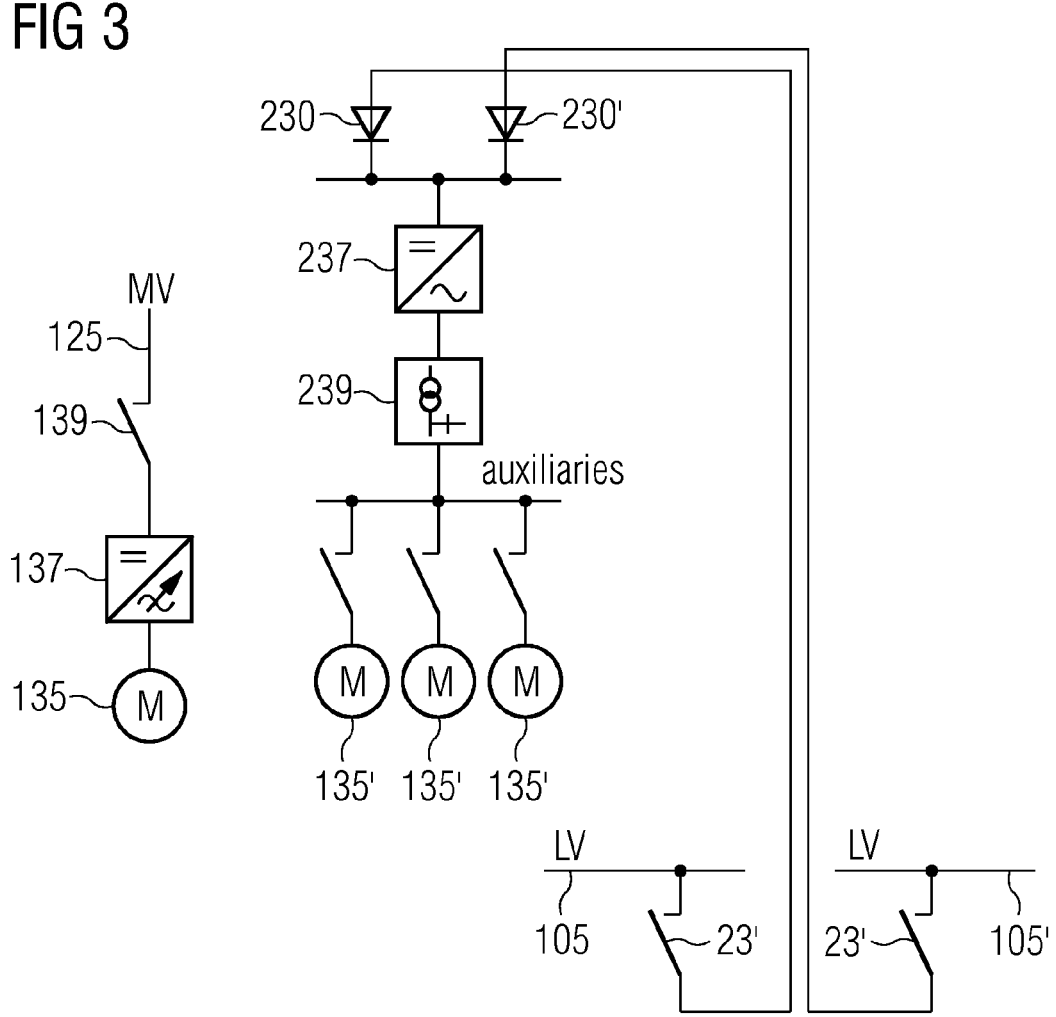
Figure 4:
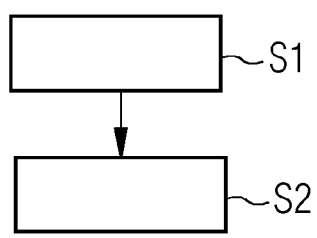

Examples of an arrangement and method according to the present invention will now be described with reference to the accompanying drawings in which:

FIGS. 1A and 1B schematically illustrate a circuit diagram of an arrangement for distribution of electric energy according to an embodiment of the present invention;

FIGS. 2A and 2B schematically illustrate a circuit diagram of an arrangement for distribution of electric energy according to another embodiment of the present invention;

FIG. 3 schematically illustrates a circuit diagram of an arrangement for distribution of electric energy to a thruster and its auxiliary equipment, for use in another embodiment of the present invention; and FIG. 4 schematically illustrates a method of operating a stored electric energy distribution arrangement, according to yet another example embodiment of the present invention.

DETAILED DESCRIPTION OF EXAMPLE EMBODIMENTS

The illustration in the drawings is in schematic form. It is noted that in different figures, similar or identical elements are provided with the same reference signs or with reference signs, which are different from the corresponding reference signs only within the first digit.

The present disclosure may provide a system for distribution of electrical energy on a vessel or platform with, where a reliable energy backup system is achieved that requires less complex equipment, which is less bulky and costly, whilst at the same time ensuring a reliable and safe supply of electric energy to essential components of the vessel in case of a failure in either a main energy distribution grid or some sub-components within the energy distribution grid.

The arrangement 100 for distribution of electric energy on a vessel illustrated in FIG. 1 comprises a first DC-circuit 101 having a plurality of backup electric energy supply elements in the form of batteries 103. In normal operation the first DC-circuit 101 is supplied by generators 127, via power converters 133, the generators 127 being responsible for primary electric energy supply to the arrangement 100. The first DC-circuit 101 comprises a Low Voltage (LV) DC-circuit, for example operating at around 930 V DC, as determined by the output of the power converters 133.

In normal operation AC consumers coupled to the first DC-circuit 101 and comprising a first AC consumer group are supplied from the first DC-circuit 101 with electric energy from the generators 127 via the power converters 133. The first AC consumer group comprises thrusters 123, as described in more detail below. In normal operation electric energy delivered to the first DC-circuit 101 can also be supplied to the backup electric energy supply elements for storage, i.e., to charge the batteries 103.

Also part of the arrangement 100 is second DC-circuit 102 which, in normal operation is also supplied by the generators 127. The generators 127 comprise diesel motors coupled to AC electric generators. A rectifier 130 associated with the generator 127 converts AC supplied to its input into DC, for supply to the second DC-circuit as "HV supply" in FIG. 1. In normal operation, during, the rectifier is fed the output of the associated generator 127. The second DC-circuit 102 comprises a Medium Voltage (MV) DC-circuit, for example operating at around 12 kV DC.

In the event of failure of the primary electric energy supply from the generators 127, the backup electric energy storage elements deliver stored energy to the first DC-circuit 101, for use in the AC consumers of the first AC consumer group.

In addition, the first DC-circuit 101 is coupled to the power converter 133, which enables power to be delivered from the first DC-circuit 101 to the second DC-circuit 102 at the higher voltage level of the second DC-circuit, for use in the AC consumers of the second AC consumer group.

As well as delivering electric energy to the HV supply to power the second DC-circuit, the primary electric energy supply also feeds the power converter 133 through the LV supply of FIG. 1, via isolation switch 141 and transformer 143. A filter 145 is provided between the transformer 143 and the power converter 133, as explained in more detail below in relation to operation in the event of failure of the primary electric energy supply.

In normal operation, the LV supply from the primary electric energy supply is passed, as AC, to the power converter 133, and electric energy is delivered there-form to the first DC-circuit 101. The power converter 133 controls the operating voltage of the first DC-circuit. Protection elements 147 in the form of a switch and fuse are provided between the power converter 133 and the first DC-circuit.

In case of a failure in the primary electric energy source the power converter 133 changes its operation mode and passes electric energy passes there-through to the second DC-circuit. In this case the power converter operates as a pulse width modulating inverter, and the output therefrom is filtered by the filter 145, and transformed by the transformer 143 so as to be compatible with the normal alternating voltage of the LV supply. The LV supply operates in this way to feed the rectifier 130, and thus energy from the batteries 103 is made available for use in the AC consumers in the second AC consumer group. Another function of the transformer 143 is to provide galvanic isolation between the first and second DC-circuits.

The operation of the power converters 133, the other active elements such as the breakers described below is performed by a controller (not shown) according to sensed conditions in the arrangement 100 for distribution of electric energy and the vessel generally, in accordance with normal control system considerations. The controller may be centralised or distributed, and is to be understood as responsible for determining the connection of circuit elements and distribution of electric energy as described in this document.

Via an inverter system 117 comprising four inverters 119, 119' the first DC-circuit 101 is connectable, via switches 121 and fuses 122, to AC consumers of the first AC consumer group. In the example illustrated the AC consumers 123 comprise essential thrusters, but the actual type of AC consumer and its rating depend upon the application. Thrusters with rating of 5.5 MW are envisaged, for example.

For this example, the vessel being supplied with electric energy by the arrangement 100 comprises four thrusters 123 coupled to the first DC-circuit, which are used in positioning the vessel on the sea. The thrusters 123 comprise fore and aft port thrusters and fore and aft starboard thrusters. More or fewer thrusters may be provided. In contrast with an AC distribution arrangement, which typically requires both a transformer and a dedicated power electronics driver for each thruster, the use of a suitable DC feed for the inverters and inverter configuration means that the power conversion and drive control functions for the thruster can be readily integrated. This enables elimination of the transformer, so saving space around the thruster and simplifying its connection to the distribution arrangement. Furthermore this arrangement enables better control when driving thrusters at low speed, because, in contrast with an AC distribution arrangement, the output of the inventers is not linked to the operating frequency of AC input.

In the first DC-circuit 101 the inverter system 117 further comprises an inverter 119' that operates as a consumer inverter to provide AC power, via a filter element 165 and a consumer transformer 167, to an auxiliary consumer ring 169, 169'. The auxiliary consumer ring 169 is divided into sections by breakers 163, 163' for protection purposes in the event of a failure in one part thereof. The auxiliary consumer ring may comprise auxiliary consumers as a third AC consumer group, such as a pump for a bearing or the like, or thruster auxiliary (not shown in FIG. 1). In this example, the auxiliary consumer ring 169, 169' is rated at 690V, but the rating depends upon the specific application as will be understood.

In a similar manner, in the second DC-circuit 102 inverters 137 are used in the second DC-circuit 102 to connect, via switches 139 to AC consumers 135 of the first AC consumer group. In the example illustrated the AC consumers 135 comprise thrusters, a utility transformer, drilling transformer or the like.

The batteries 103 are connected to the first DC-circuit 101 by first DC buses (105, 105'), for example cable sections, or bus bar sections, via a switch 115 and fuse 113, and are provided with local protection in the form of a switch 115' and a fuse 113'. In the example shown, the batteries 103 are able to provide 1.25 MW for up to 60 minutes, but other storage capacities may be chosen according to operational requirements. Since the power converter 133 operates to control the voltage in the first DC-circuit, no local transformer/rectifier that might otherwise be needed to couple the batteries to an AC distribution arrangement. By design integration of the power converter 133 and the battery 103 with the demand from the AC consumers in the first AC consumer group, it becomes possible to operate the first DC-circuit to supply the inverters for the AC consumers of the first AC consumer group, and the batteries without any DC-DC conversion requirements. Thus, the power converter simplifies the connection of the backup electric energy storage elements to the first DC-circuit.

The backup electric energy storage elements are connected in a ring, formed by cable sections or bar sections 105, 105'. Breaker units 109 are positioned between the bar sections 105,105'. Each breaker unit 109 comprises power transistors connected in series to disrupt a connection from a bar sections 105, 105' in the first DC-circuit 101 within a few microseconds. The disconnection may for example occur in the event of a failure. For detection of such a failure, each breaker unit 109 comprises measurement sensors and control logic that disconnects or disrupts a connection if, for example, a measured current is above a current threshold and/or a measured voltage difference between the two sides is above a voltage threshold.

In the second DC-circuit 102 each of the plurality of generators 127 is connected to in a ring, formed by second DC buses 125, 125', for example, cable sections or bar sections via switches 129. In FIG. 1 the rectifiers 130 are shown schematically as a simple diode, but it is to be understood that other rectification arrangements are to be used, with diode functionality from the rectifier blocking energy flow from the second DC-circuit 102 back to the associated generator 127, and to the first DC-circuit 101 as explained in more detail in relation to operation of the power converter 133.

Breaker units 129 are positioned between the bar sections 125,125'. Each breaker unit 129 comprises power transistors connected in series to disrupt a connection from a bar sections 125, 125' in the second DC-circuit 102 within a few microseconds. The disconnection may for example occur in the event of a failure. For detection of such a failure, each breaker unit 129 comprises measurement sensors and control logic that disconnects or disrupts a connection if, for example, a measured current is above a current threshold and/or a measured voltage difference between the two sides is above a voltage threshold. As will be appreciated, providing redundancy in interconnection between the first and second DC-circuits, in both directions, increases the operational resiliency of the arrangement overall in response to failures in an individual element. Whereas FIG. 1 includes an arrangement that is shown in two parts across FIGS. 1A and 1B, the arrangement is scalable so may be extended to three, four or more corresponding parts.

FIGS. 2A and 2B schematically illustrate a circuit diagram of an arrangement for distribution of electric energy 200, according to another embodiment of the present invention. In this embodiment there are two variations, compared to the embodiment of FIGS. 1A and 1B.

Firstly, dc-dc converters 223 are provided between the first DC-circuit and the batteries 103. The dc-dc converters 223 are useful to control supply of charge to the batteries 103, and to match the battery voltage to the operating voltage of the first DC-circuit when discharging the batteries takes place to supply the first DC-circuit. The dc-dc converters 223 enable better matching of the batteries 103 to the operating voltage of the first DC-circuit, in the case where the batteries are a relatively small drain on this circuit, and consequently a relatively small source of supply to it, when considering the operating voltage and rating of the AC consumers/power converter coupled thereto.

Secondly, to increase flexibility in energy storage options, a battery 203 is provided, coupled to each of the ring that forms the second DC-circuit. In other embodiments that are not shown, dc-dc converters may be provided for the batteries 203 of the second DC-circuit.

FIG. 3 schematically illustrates a circuit diagram of an arrangement for distribution of electric energy to a thruster and its auxiliary equipment, according to another embodiment of the present invention.

As an alternative, or in addition to use of the auxiliary consumer ring 169 shown in FIG. 1, there may be advantages in using the second DC-circuit 102 to supply AC consumers such as auxiliary components. FIG. 3 shows thruster auxiliaries 135 associated with a thruster 135. The thruster 135 is fed from the second DC-circuit by an inverter 137 and is thus part of the second AC consumer group. The first AC consumer group comprises the auxiliary equipment 135', to be fed from the first DC-circuit 101 by an auxiliary inverter 237. A filter 239 is provided to smooth the output of the auxiliary inverter 237. In order to increase resilience, the auxiliary equipment 135' is connected to more than one part of the second DC-circuit, in this case to both bar 105 and bar 105'.

As will be appreciated, the redundancy in supply to the auxiliary equipment 135' ensures consistency of supply, if either one of the parts of the second DC-circuit suffers a failure. Diodes 230, 230' are provided for isolation of the two bars 105, 105' at the input side of the auxiliary inverter 237 where the two connections to bars 105, 105' meet, and switches 231, 231' are configured to selectively isolate of the auxiliary components 135' from the second DC-circuit if required.

Typically, the first DC bus 105 may be operated at a first voltage level and the second DC bus 125 may be operated at a second voltage level, higher than the first voltage level. In the event of the output of the AC generator 127 to the primary consumers 135 on the second DC bus 125 being insufficient, or failing, then energy from electric energy storage elements is supplied to the primary consumers via the rectifier 130 and the second DC bus 125. The electric energy storage elements 103, 203 may be on the first or the second DC bus.

FIG. 4 schematically illustrates a method of operating a stored electric energy distribution arrangement, according to an example embodiment of the present invention. The method is performed in a vessel in the event of failure, or insufficiency, of a primary electric energy supply. In step S1 electric energy may be supplied to one or more AC consumers in a first AC consumer group coupled to the first DC-circuit 101 of a vessel, for example, from a backup electric energy storage element 103 of the first DC-circuit. In step S2 electric energy may be supplied to one or more AC consumers 135 in a second AC consumer group coupled to the second DC-circuit 102, from the first DC-circuit 101 and via the rectifier 130, in the event of failure of the primary electric energy supply, or there being insufficient energy supply available from the primary energy supply. In further steps, not shown electric energy may pass from the primary electric energy supply (127), when operational, to the first and second DC-circuits 101, 102.

By use of an electric distribution arrangement as described herein, high security and high reliability of the operation of the vessel may be achieved, and the costs involved in scaling the backup energy. For example, a one to one relationship between generators and power converters to distribute electric energy from the generators to the first DC-circuit, and between batteries and the same associated power converters may be provided. As will be appreciated, spreading the generation and distribution of electric energy across a plurality of generators/batteries with an associated plurality of power converters as described increases resilience in the arrangement, and also enables lower rating of the individual distributed elements.

It should be noted that the term "comprising" does not exclude other elements or steps and "a" or "an" does not exclude a plurality. Also elements described in association with different embodiments may be combined. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. It should also be noted that reference signs in the claims should not be construed as limiting the scope of the claims. The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An electrical energy distribution system for a vessel or platform, the system comprising:
at least a primary energy source;
wherein the primary energy source comprises an AC generator;
wherein a first output of the AC generator is coupled to a first DC bus via a transformer and an AC to DC converter; and
wherein a second output of the AC generator is separately coupled to a second DC bus via a rectifier;
wherein the second DC bus is operable at a first voltage level and is connected to one or more primary consumers;
wherein the first DC bus is operable at a first voltage level, lower than a second voltage level and is connected to secondary consumers; and
wherein in the event of the output of the AC generator to the primary consumers on the second DC bus being insufficient, energy from electric energy storage elements is supplied to the primary consumers via the rectifier and the second DC bus.

2. A system according to claim 1,
wherein a second DC-circuit associated with the second DC bus is operable at a higher voltage than a first DC-circuit associated with the first DC bus.

3. A system according to claim 1,
wherein the rectifier comprises a diode rectifier.

4. A system according to claim 2,
wherein both of the DC circuits include a stored energy source.

5. A system according to at least claim 2,
wherein the primary energy source comprises a plurality of generators to supply electric energy to the first DC-circuit, and to the second DC-circuit, in normal operation.

6. A system according to claim 2,
wherein the second DC-circuit comprises a Medium Voltage DC-circuit, and the first DC-circuit comprises a Low Voltage DC-circuit.

7. A system according to claim 2,
wherein the first DC-circuit is operatively coupled to the second DC-circuit via a power converter that comprises an inverter, a transformer and rectifier, in event of failure of the primary electric energy supply.

8. A system according to claim 7,
wherein the primary electric energy supply is operatively coupled to the first DC-circuit via the power converter, in normal operation of the primary electric energy supply.

9. A system according to claim 8,
wherein the power converter is configured for two way operation, such that in normal operation of the primary electric energy supply, electric energy passes therethrough from the primary electric energy supply to the first DC-circuit, and in event of failure of the primary electric energy supply electric energy passes therethrough to the second DC-circuit from the first DC-circuit.

10. A system according to claim 2,
wherein the second DC-circuit comprises a plurality of generators coupled thereto for supplying electric energy to the second DC-circuit, and connected in a ring, and for supplying electric energy there-from to one or more AC consumers of a first AC consumer group, and further comprises at least one breaker unit operable to disconnect one or more generators from the second DC-circuit in the event of a fault on the second DC-circuit.

11. A system according to claim 2,
wherein the first DC-circuit comprises a plurality of backup electric energy storage elements connected in a ring, for supplying electric energy to the first DC-circuit, and further for supplying electric energy therefrom to one or more AC consumers in the second DC-circuit in the event of failure of the primary electric energy supply, and further comprises at least one breaker unit operable to disconnect one or more backup electric energy storage elements from the first DC-circuit in the event of a fault on the first DC-circuit.

12. A system according to claim 11,
wherein the backup electric energy storage elements comprise a battery for storing electric energy, for use in the event of failure of the primary electric energy supply.

13. A system according to claim 10,
wherein AC consumers of the first AC consumer group are connected to the first DC-circuit via an inverter system, and/or wherein AC consumers of a second AC consumer group are connected to the second DC-circuit via inverter system.

14. A system according to claim 13,
wherein the AC consumers of the first and/or second AC consumer groups comprise one or more of: a variable speed drive, a thruster, or auxiliary equipment.

15. A system according to claim 13,
wherein the second AC consumer group comprises a thruster fed from the second DC-circuit by a thruster inverter, and the first AC consumer group comprises auxiliary equipment associated with that thruster and which is fed from the first DC-circuit by an auxiliary inverter.

16. A method of operating a stored electric energy distribution arrangement for distribution of electric energy on a vessel comprising a plurality of AC consumers, the method comprising:
supplying electric energy to one or more AC consumers in a first AC consumer group coupled to a first DC-circuit, from a backup electric energy storage element of the first DC-circuit, in the event of failure of a primary electric energy supply; and
supplying electric energy to one or more AC consumers in a second AC consumer group coupled to a second DC-circuit, from the first DC-circuit and via a power converter, in the event of failure of a primary electric energy supply.

17. A method of operating an electrical energy distribution system for a vessel or platform, the system comprising at least a primary energy source; wherein the primary energy source comprises an AC generator; wherein a first output of the AC generator is coupled to a first DC bus via a transformer and an AC to DC converter; and
wherein a second output of the AC generator is separately coupled to a second DC bus via a rectifier; wherein the second DC bus is connected to one or more primary consumers; wherein the first DC bus is connected to secondary consumers; the method comprising:
operating the first DC bus at a first voltage level; operating the second DC bus at a second voltage level, higher than the first voltage level; and
in the event of the output of the AC generator to the primary consumers on the second DC bus being insufficient, supplying energy from electric energy storage elements to the primary consumers via the rectifier and the second DC bus.

* * * * *